US008693409B2

(12) United States Patent  
Cave et al.

(10) Patent No.: US 8,693,409 B2  
(45) Date of Patent: Apr. 8, 2014

(54) METHOD AND APPARATUS FOR SUPPORTING PAGING OVER AN HS-DSCH IN CELL_PCH AND URA_PCH STATES

(75) Inventors: Christopher R. Cave, Verdun (CA); Diana Pani, Montreal (CA); James M. Miller, Verona, NJ (US); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 1548 days.

(21) Appl. No.: 12/186,650

(22) Filed: Aug. 6, 2008

(65) Prior Publication Data

US 2009/0052376 A1    Feb. 26, 2009

Related U.S. Application Data

(60) Provisional application No. 60/955,217, filed on Aug. 10, 2007, provisional application No. 60/969,832, filed on Sep. 4, 2007, provisional application No. 60/986,154, filed on Nov. 7, 2007.

(51) Int. Cl.
   *H04W 4/00* (2009.01)

(52) U.S. Cl.
   USPC .......................................... 370/329

(58) Field of Classification Search
   None
   See application file for complete search history.

(56) References Cited

U.S. PATENT DOCUMENTS 7,076,248 B2 * 7/2006 Amirijoo et al. ........... 455/432.1

FOREIGN PATENT DOCUMENTS

JP    2001-352570 A    12/2001

OTHER PUBLICATIONS

3GPP TSG RAN WG2 #56, Tdoc R2-063210; Ericsson, Nokia; Enhanced Paging Procedure; Riga, Latvia, Nov. 6-10, 2006; pp. 1-2.*
Third Generation Partnership Project, Technical Specification Group Radio Access Network; Medium Access Control (MAC) protocol specification (Release 7), 3GPP TS 25.321 V 7.5.0 (Jul. 2007).
Third Generation Partnership Project, Technical Specification Group Radio Access Network; Medium Access Control (MAC) protocol specification (Release 7), 3GPP TS 25.321 V 7.9.0 (Jun. 2008).
Third Generation Partnership Project, Technical Specification Group Radio Access Network; Medium Access Control (MAC) protocol specification (Release 7), 3GPP TS 25.321 V 8.2.0 (Jun. 2008).
Nokia Siemens Networks, Nokia, "Introduction of HS-DSCH reception in CELL_FACH, URA_PCH and CELL_PCH," 3GPP TSG-WG2 Meeting #58, R2-072305, (Kobe, Japan, May 7-11, 2007).

(Continued)

*Primary Examiner* — Rhonda Murphy
(74) *Attorney, Agent, or Firm* — Condo Roccia LLP

(57) ABSTRACT

A method and apparatus for paging a wireless transmit/receive unit (WTRU) in a CELL_PCH and URA_PCH states are disclosed. A WTRU may send an indication of an enhanced paging channel (PCH) capability of receiving a high speed downlink shared channel (HS-DSCH) in CELL_PCH and URA_PCH states, for example, in a CELL UPDATE message, a URA UPDATE message, or a UTRAN MOBILITY INFORMATION CONFIRM message. A drift radio network controller (DRNC) may receive an indication whether the WTRU has an enhanced PCH capability from a serving RNC and page the WTRU based on the indication. An RNC may page the WTRU over both an HS-DSCH and a PCH/secondary common control physical channel (S-CCPCH) if a WTRU capability is not known. The WTRU may monitor both an HS-DSCH and a PCH/S-CCPCH. The WTRU may configure reception over an HS-DSCH based on the capability of the SRNC or configuration from the network.

12 Claims, 3 Drawing Sheets

(56) References Cited

OTHER PUBLICATIONS

Third Generation Partnership Project, Technical Specification Group Radio Access Network; Radio Resource Control (RRC); Protocol Specification (Release 7), 3GPP TS 25.331 V 7.5.0 (Jul. 2007).

Third Generation Partnership Project, Technical Specification Group Radio Access Network; Radio Resource Control (RRC); Protocol Specification (Release 7), 3GPP TS 25.331 V 7.9.1 (Aug. 2008).

Third Generation Partnership Project, Technical Specification Group Radio Access Network; Radio Resource Control (RRC); Protocol Specification (Release 8), 3GPP TS 25.331 V 8.3.1 (Aug. 2008).

Nokia Siemens Networks, Nokia, "Measurement Gap Creation," 3GPP TSG-RAN WG2 Meeting #58-bis, R2-072391, (Orlando, Florida, USA, Jun. 25-29, 2007).

Nokia Siemens Networks, Nokia, "Iur Backward Compatibility," EGPP TSG-RAN-WG2 Meeting #60, R2-075494, (Jeju, Island, Korea, Nov. 5-9, 2007).

Ericsson, "Stage 2 Updates for Enhanced CELL_PCH and URA_PCH State in FDD," 3GPP TSG-RAN WG2 Meeting #57, R2-070812 (Feb. 12-16, 2007).

Interdigital, "Issues with Legacy UTRAN and Enhanced CELL_FACH State," 3GPP TSG-RAN WG2#59, R2-073181 (Aug. 20-24, 2007).

Nokia Siemens Networks et al., "Update of Enchanced Cell_FACH," 3GPP TSG-RAN WG3 Meeting #56, R3-071005 (May 7-11, 2007).

Nokia Siemens Networks et al., "Introduction of Enhanced Cell_FACH state feature," 3GPP TSG-RAN WG3 Meeting #55, R3-070756 (May 7-11, 2007).

Nokia, "Solution on Iur Problem with pre-Rel7 SRNC," 3GPP TSG-RAN WG3 Meeting #55, R3-070278 (Feb. 12-16, 2007).

\* cited by examiner

METHOD AND APPARATUS FOR SUPPORTING PAGING OVER AN HS-DSCH IN CELL_PCH AND URA_PCH STATES

CROSS REFERENCE TO RELATED APPLICATIONS

This application claims the benefit of U.S. provisional application Nos. 60/955,217 filed Aug. 10, 2007, 60/969,832 filed Sep. 4, 2007, and 60/986,154 filed Nov. 7, 2007, which are incorporated by reference as if fully set forth.

FIELD OF INVENTION

This application is related to wireless communications.

BACKGROUND

Four radio resource control (RRC) states are defined in the conventional third generation partnership project (3GPP) specifications. Those RRC states are CELL_DCH state, CELL_FACH state, CELL_PCH state, and URA_PCH state. Improvements on the conventional CELL_FACH and CELL/URA_PCH states have been introduced to the 3GPP specifications to enhance the overall quality of experience (QoE) perceived by end users. The CELL_FACH and CELL_URA_PCH improvements attempt to reduce state transition delays and overall signaling latencies by using high speed downlink packet access (HSDPA) resources in the CELL_FACH and CELL/URA_PCH states.

With an introduction of the enhanced CELL_FACH state, a high speed downlink shared channel (HS-DSCH) may be used in the CELL_FACH state. The HS-DSCH replaces the conventional forward access channel (FACH). A wireless transmit/receive unit (WTRU) with enhanced FACH capability will receive downlink messages over the HS-DSCH. For example, downlink RRC messages, (e.g., CELL UPDATE CONFIRM and URA UPDATE CONFIRM messages), will be sent to the WTRU over the HS-DSCH in the CELL_FACH state.

With an introduction of the enhanced CELL/URA_PCH states, the HS-DSCH may also be used in the CELL_PCH and URA_PCH states. The HS-DSCH replaces the conventional FACH and PCH, and dedicated control channel (DCCH) and dedicated traffic channel (DTCH) may be transmitted to the WTRU in the CELL_PCH state over the HS-DSCH. A WTRU with enhanced PCH capability will receive paging messages over the HS-DSCH when in CELL/URA_PCH states.

The WTRU may autonomously transition from the CELL_PCH state to the CELL_FACH state if the WTRU has uplink data or signaling to transmit. Multiple discontinuous reception (DRX) cycle may be defined in the CELL_PCH and URA_PCH states, which is a power saving mechanism that allows the universal terrestrial radio access network (UTRAN) to quickly access low activity WTRUs.

A WTRU or network that supports enhanced PCH has to also support enhanced FACH. However, the WTRU or network may support enhanced FACH without supporting the enhanced PCH. Therefore, when a WTRU triggers a UTRAN routing area (URA) update and both the WTRU and the network support enhanced FACH but not enhanced PCH, a URA UPDATE CONFIRM message will be received over the HS-DSCH but the WTRU will receive the paging message over the PCH. However, when the WTRU supports enhanced PCH, both the URA UPDATE CONFIRM message and paging messages are received over the HS-DSCH.

For paging in the CELL/URA_PCH states, a 3GPP Release 7 WTRU monitors a paging indicator channel (PICH), similar to 3GPP Release 6. Once a paging indication is detected, the WTRU monitors the HS-DSCH for reception of the paging control channel (PCCH) frame rather than monitoring the PCH/secondary common control physical channel (S-CCPCH).

When selecting a cell, a Release 7 WTRU determines if the cell supports enhanced FACH based on the configuration information that is broadcast on the broadcast control channel/broadcast channel (BCCH/BCH). More specifically, a system information block (SIB) Type 5/5bis includes two information elements (IEs): "HS-DSCH common system information" and "HS-DSCH paging system information". These IEs provide configuration information necessary for the WTRU to receive HS-DSCH in the CELL_FACH, CELL_PCH and URA_PCH states.

A WTRU determines support for HS-DSCH reception in the CELL/URA_PCH states based on the configuration information that is broadcast in the cell on the BCCH/BCH. If the HS-DSCH paging system information is present in SIB 5/5bis, the WTRU configures itself for reception over the HS-DSCH rather than the PCH/S-CCPCH.

However, a drift radio network controller (DRNC) is not fully aware of the WTRU capabilities when in the CELL_PCH state. When the CELL UPDATE message is sent to the DRNC, the WTRU only indicates whether it supports the enhanced CELL_FACH state. A WTRU with enhanced CELL_FACH capabilities has an option of supporting HS-DSCH reception only in the CELL_FACH state or HS-DSCH reception both in the CELL_FACH and CELL/URA_PCH states. This is not indicated in the CELL UPDATE message and thus the DRNC does not know how to page the WTRU. If a serving radio network controller (SRNC) attempts to page the WTRU using the paging type 1 mechanism, the DRNC does not know which channel the WTRU monitors for paging, (i.e., HS-DSCH or PCH/S-CCPCH).

When the WTRU is in the URA_PCH state, the DRNC is unaware of the WTRU's capabilities unless explicitly indicated by the SRNC. The SRNC might not indicate the WTRU capabilities, (i.e., enhanced CELL_FACH capabilities), to the DRNC if the WTRU in the URA_PCH state is paged by the SRNC and has roamed to the cell without having performed UTRAN registration or cell update, or if the WTRU is connected to a Release 6 SRNC and roams to a Release 7 cell in the network.

In the first case, the SRNC sends a PAGING REQUEST message over Iur to an RNC that controls the cells in the UTRAN registration area (URA) group. However, the DRNC is unaware of which paging channel the WTRU is monitoring, (i.e., HS-DSCH or PCH/S-CCPCH). The DRNC is unaware of the WTRU capabilities unless the WTRU has performed a URA update at an earlier time in one of the cells that are controlled by the RNC. As such, the DRNC may page the WTRU over HS-DSCH in all cells that support paging over HS-DSCH. However, if the WTRU does not support HS-DSCH reception in the CELL_PCH state, the WTRU will never receive the paging indication. The DRNC may page the WTRU over PCH/S-CCPCH. However, if the WTRU and the cell both support HS-DSCH reception in the CELL_PCH state, the WTRU will never receive the paging message as it is monitoring HS-DSCH instead of PCH.

In the second case, a Release 7 WTRU roams to a Release 7 cell within the same URA, while connected to a Release 6 SRNC. The WTRU will monitor HS-DSCH for paging because the HS-DSCH paging system information is broadcast in the cell. However, the Release 7 DRNC is unaware of which channel the WTRU is monitoring for paging messages since the DRNC does not have any knowledge of the WTRU capabilities.

In addition, in the case where the WTRU does not support enhanced PCH but supports enhanced FACH, if a URA UPDATE is triggered and the CRNC is not aware of the WTRU capabilities it will not know over what transport channel to send the RRC messages, (e.g., URA UPDATE CONFIRM message).

SUMMARY

A method and apparatus for paging a WTRU in a CELL_PCH and URA_PCH states are disclosed. A WTRU may send an indication of an enhanced PCH capability of receiving an HS-DSCH in CELL_PCH and URA_PCH states, for example, in a CELL UPDATE message, a URA UPDATE message, or a UTRAN MOBILITY INFORMATION CONFIRM message. A DRNC may receive an indication whether the WTRU has an enhanced PCH capability from a serving RNC and page the WTRU based on the indication. An RNC may page the WTRU over both an HS-DSCH and a PCH/S-CCPCH if a WTRU capability is not known. The WTRU may monitor both an HS-DSCH and a PCH/S-CCPCH. The WTRU may configure reception over an HS-DSCH based on the capability of the SRNC or configuration from the network.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the term "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the term "Node B" includes but is not limited to a base station, a site controller, an access point (AP), or any other type of interfacing device capable of operating in a wireless environment.

Figure 1:
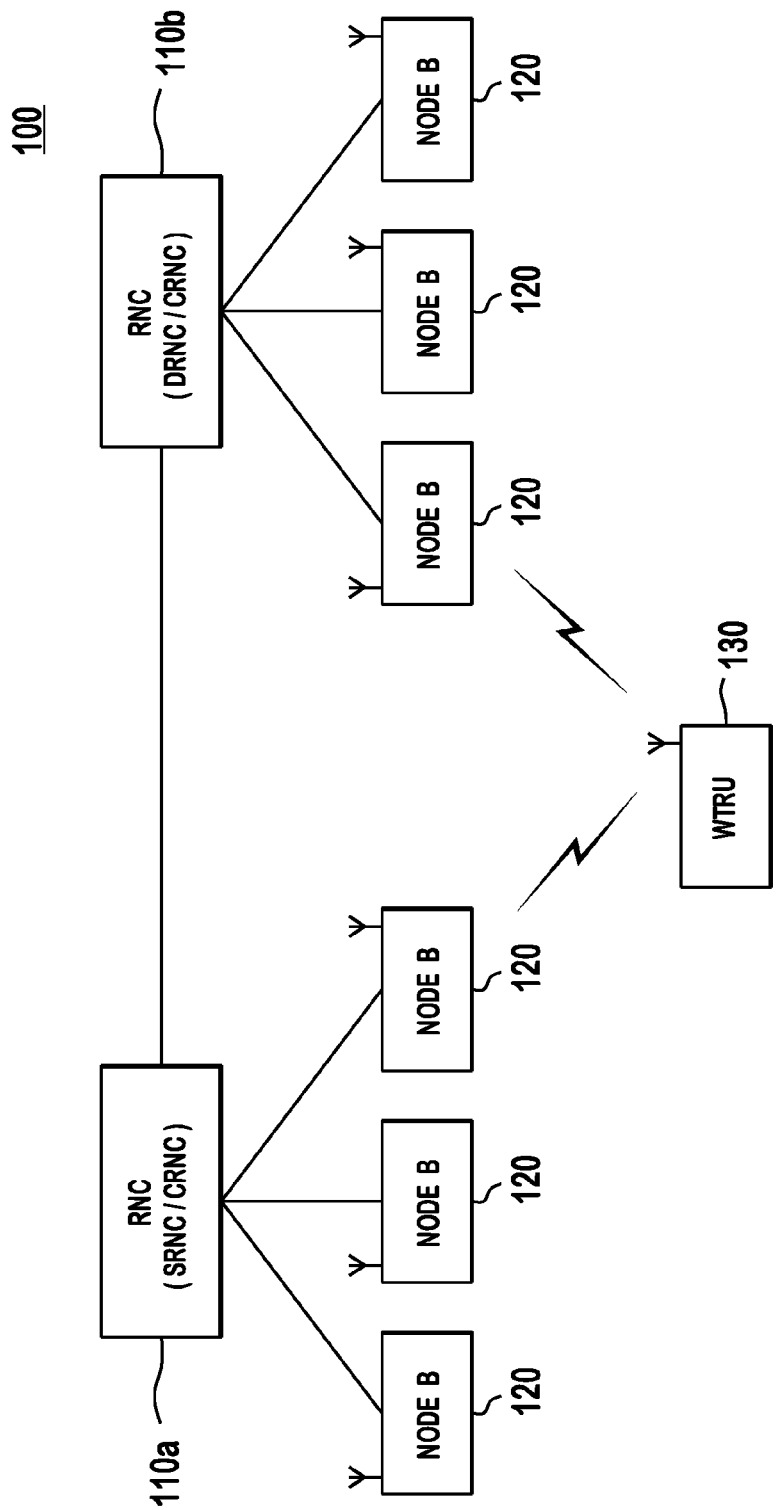
FIG. 1 shows a conventional UTRAN.

FIG. 1 shows a conventional UTRAN 100. The UTRAN 100 includes a plurality of RNCs 110a, 110b and a plurality of Node Bs 120. Each RNC 110a, 110b has a CRNC function to control one or more Node Bs. An SRNC 110a controls a connection for a WTRU 130. A DRNC 110b lends resources for the SRNC 110a for a particular WTRU 130. The WTRU 130 sends a CELL UPDATE message to a CRNC, (the CRNC may be an SRNC or a DRNC), after cell reselection to support inter RNC cell update and SRNC relocation in a CELL_FACH state. The WTRU 130 sends an URA UPDATE message to a CRNC after detection of URA change to support inter RNC mobility in CELL/URA_PCH states.

In accordance with a first embodiment, the WTRU may indicate a CRNC the HS-DSCH reception capability in the CELL_PCH state, (hereinafter "enhanced PCH capability), via the CELL UPDATE message. The indication may be provided in many different ways. For example, an IE may be included in the CELL UPDATE message to indicate that the WTRU supports HS-DSCH reception in the CELL/URA_PCH states. If this information is provided, the CRNC may infer that HS-DSCH reception in the CELL_FACH state is also supported. Optionally, the HS-DSCH reception capability in the CELL_FACH state may be indicated independently. If this IE is not present, the WTRU does not support HS-DSCH reception in the CELL/URA_PCH states.

Alternatively, the conventional "UE capability indication" may be extended to indicate if the WTRU supports HS-DSCH reception in CELL_FACH and/or CELL/URA_PCH states. The "UE capability indication" may be interpreted as an enumeration, which may take on the following values:

(1) HS-DSCH in CELL_FACH. If set, the WTRU only supports HS-DSCH reception in the CELL_FACH state;

(2) HS-DSCH in CELL/URA_PCH. If set, the WTRU supports HS-DSCH reception in the CELL_FACH and in CELL/URA_PCH states; and (3) None. If set, the WTRU does not support HS-DSCH reception in the CELL_FACH or CELL/URA_PCH states.

When a DRNC receives the CELL UPDATE message indicating that the WTRU is in the CELL_PCH state and supports HS-DSCH reception in the CELL_PCH state, the DRNC may allocate a dedicated HS-DSCH radio network temporary identifier (H-RNTI) and other CELL_PCH specific parameters and transfer these to the SRNC. A CELL UPDATE CONFIRM message is sent over the HS-DSCH to the WTRU.

A DRNC may store the WTRU capability information in a memory. When an SRNC sends a PAGING REQUEST message to the DRNC over Iur, the DRNC may page the WTRU over an HS-DSCH or a PCH/S-CCPCH based on the capability information stored in the memory.

If a WTRU supports HS-DSCH reception only in the CELL_FACH state, (i.e., does not support HS-DSCH reception in the CELL/URA_PCH states), the CRNC does not have to allocate a dedicated H-RNTI to the WTRU. However, the CRNC transfers the CELL UPDATE CONFIRM message to the WTRU over the HS-DSCH.

In order to ensure reception of the URA UPDATE CONFIRM message, the DRNC must be notified of the WTRU's capabilities. The HS-DSCH reception capability information may be transmitted in the CELL/URA_PCH states using the URA UPDATE message. This allows the DRNC that receives the URA UPDATE message to know if the WTRU supports HS-DSCH reception in the CELL/URA_PCH states.

The indication may be signaled in many different ways. For example, a new IE, (e.g., WTRU capability indication in CELL/URA_PCH), may be included in the URA UPDATE message to indicate whether the WTRU supports HS-DSCH reception in CELL/URA_PCH states. In addition, a new IE, (e.g., WTRU capability indication in CELL_FACH), may be included in the URA UPDATE message to indicate if the WTRU supports HS-DSCH reception in CELL_FACH.

Alternatively, a new IE, (e.g., WTRU capability indication), that is an enumerated value may be added, where one of the following values can be indicated:

(1) HS-DSCH in CELL_FACH. If this is set, the WTRU only supports HS-DSCH reception in CELL_FACH;

(2) HS-DSCH in CELL/URA_PCH. If this is set, the WTRU supports HS-DSCH reception in CELL_FACH and in CELL/URA_PCH; and (3) None. No support for HS-DSCH reception in CELL_FACH and/or CELL/URA_PCH.

A new IE may be added to indicate that the WTRU supports 3GPP release 7.

When a WTRU roams between cells that do not support enhanced CELL_FACH and/or enhanced PCH, (e.g., Release 6 cells), and cells that support enhanced CELL_FACH and/or enhanced PCH, (e.g., Release 7 cells), the WTRU capability information may be transferred to an RNC. The WTRU capability information may be transferred by triggering a cell update procedure or a URA update procedure, where the WTRU may include the capability information as described above.

In a URA_PCH state, a WTRU may perform a cell update or URA update procedure even when roaming within the same URA if the capabilities of a new cell are different than the capabilities of an old cell. Preferably, the indication of the WTRU capabilities by transferring the URA UPDATE message is performed if the new cell supporting enhanced FACH and/or enhanced PCH is controlled by a CRNC that is different than the SRNC, (i.e., an Iur is established between the SRNC and the CRNC).

The WTRU may determine that the CRNC is different than the SRNC if an SRNC identity in the UTRAN radio network temporary identity (U-RNTI) of the WTRU is different than the 12 most significant bits of the cell identity that is broadcast throughout the cell. This added restriction on the transfer of URA UPDATE message reduces the number of unnecessary URA UPDATE messages that need to be sent to the UTRAN.

In order to further reduce the transfer of unnecessary URA UPDATE messages including WTRU capability information, the triggering criterion may be restricted to the following situations:

(1) A WTRU has roamed from a cell that does not support enhanced FACH and/or enhanced PCH to a cell that supports enhanced FACH and/or enhanced PCH;

(2) The new cell is controlled by a CRNC that is different than the SRNC;

(3) The new cell is controlled by a CRNC that is different from the CRNC that controlled the previous cell; or (4) The WTRU is unaware if the SRNC to which it is connected supports enhanced FACH and/or enhanced PCH.

The WTRU may determine if the SRNC to which it is connected supports enhanced PCH by maintaining an internal variable indicating SRNC enhanced FACH and/or PCH capability. When the internal variable is set to FALSE, the WTRU behaves as if it is unaware if the SRNC to which it is connected supports enhanced FACH and/or enhanced PCH. When the internal variable is set to TRUE, the WTRU knows that the SRNC supports enhanced FACH and/or enhanced PCH.

The internal variable is initialized to FALSE and reset to FALSE when at least one of the following conditions is satisfied:

(1) A new U-RNTI is assigned to the WTRU;
(2) The WTRU RRC state changes from CELL_DCH to URA_PCH;
(3) The WTRU RRC state changes from CELL_FACH to URA_PCH;
(4) The WTRU RRC state changes from CELL_PCH to URA_PCH;
(5) The WTRU RRC state changes from URA_PCH to CELL_PCH or CELL_FACH or CELL_DCH;
(6) The WTRU receives a URA UPDATE CONFIRM message or any other RRC message in a cell that does not support enhanced PCH and/or enhanced FACH and a new U-RNTI is assigned; and
(7) The WTRU receives any RRC message while in CELL_DCH state and a new U-RNTI is assigned.

The internal variable is set to TRUE when at least one of the following conditions is satisfied:

(1) If the WTRU successfully receives a URA UPDATE CONFIRM message after having triggered the transfer of a URA UPDATE message including capability information according to the triggering condition above;

(2) If the WTRU successfully receives a URA UPDATE CONFIRM message after having transferred a URA UPDATE message in a cell that supports enhanced FACH and/or enhanced PCH;

(3) If the WTRU successfully receives a CELL UPDATE CONFIRM message after having transferred a CELL UPDATE message in a cell that supports enhanced FACH and/or enhanced PCH;

(4) If the WTRU roams to a cell that supports enhanced FACH and/or enhanced PCH and the cell is controlled by the SRNC to which it is connected, (i.e., the CRNC and the SRNC are the same node); and (5) The WTRU initiates an RRC connection in a cell that supports enhanced FACH and/or enhanced PCH.

Alternatively, in order to reduce the number unnecessary transfers of URA UPDATE message, the SRNC may initiate a serving radio network subsystem (SRNS) relocation procedure when it receives a URA UPDATE message indicating enhanced FACH and/or enhanced PCH from a WTRU having roamed to a cell that is controlled by a different RNC. This is explained in detail with reference to FIG. 3 below. Preferably, the SRNC may initiate the SRNS relocation when it receives a URA UPDATE message that was triggered by any of the conditions above. The SRNC may determine if the URA UPDATE message was triggered according to one of those conditions if the WTRU has not changed URA and the URA UPDATE message has been received prior to expiry of a periodic timer for transfer of the URA UPDATE message.

Alternatively, the SRNC may include in the Downlink Signaling Transfer Request radio network subsystem application part (RNSAP) message a new IE indicating that the WTRU supports enhanced FACH and/or enhanced PCH, and/or a new IE indicating which channel the DRNC should use to transfer the URA UPDATE CONIFRM message or any other message that is included in the Downlink Signaling Transfer Request.

As an alternative, the WTRU may include its capabilities information as part of the UTRAN MOBILITY INFORMATION CONFIRM message that is sent back to an SRNC after reception of a CELL UPDATE CONFIRM, URA UPDATE CONFIRM or UTRAN MOBILITY INFORMATION messages from the SRNC. Alternatively, the trigger for sending the UTRAN MOBILITY INFORMATION CONFIRM message may be an indication that SRNS relocation has taken place. A WTRU may determine that SRNS relocation has taken place if a new U-RNTI is assigned in the URA/CELL UPDATE CONFIRM message, or any other RRC layer messages.

In accordance with a second embodiment, the SRNC may explicitly indicate to a DRNC how to page the WTRU in the PAGING REQUEST message. Based on the WTRU radio access capabilities indicated during the RRC connection establishment or any subsequent capability indication, the SRNC may indicate to the DRNC(s) if the WTRU supports enhanced PCH in the RNSAP PAGING REQUEST message over Iur.

A new IE, (e.g., enhanced PCH indicator), may be added in the PAGING REQUEST message. The DRNC pages the WTRU over the HS-DSCH if the cell(s) within the URA support enhanced PCH, and the "enhanced PCH indicator" IE in the PAGING REQUEST message indicates that the WTRU supports enhanced PCH. Otherwise, the DRNC pages the WTRU over the PCH/S-CCPCH. If not all cells within the URA support enhanced PCH, the DRNC may page the WTRU over the HS-DSCH for the cells that support the enhanced PCH and over the PCH/S-CCPCH for the cells that do not have enhanced PCH capabilities.

The enhanced PCH indicator may take one or a combination of the following forms:

(1) An optional IE, which is present only if enhanced PCH is supported; optionally, the lack of this IE may imply that the SRNC is not a Release 7 SRNC;

(2) An IE that may be set to TRUE or FALSE;

(3) An IE that is an enumerated value, where the following values are indicated:
  i. Enhanced PCH. The SRNC supports enhanced PCH;
  ii. Optionally, an enumerated value for enhanced FACH may also be included; and
  iii. No HS-DSCH support. The SRNC does not support enhanced PCH (or optionally enhanced FACH);

(4) An IE that is provided independently of the paging area choice;

(5) An IE that is provided only if the paging area choice is URA; and (6) An IE that indicates that the WTRU to be paged is 3GPP release 7 compliant.

Alternatively, a new radio network system application part (RNSAP) message may be defined to support paging over the HS-DSCH, (e.g., an HS-DSCH PAGING REQUEST message). The SRNC may use the HS-DSCH PAGING REQUEST message to page the WTRU over the HS-DSCH, and the conventional PAGING REQUEST message to page the WTRU over the PCH/S-CCPCH.

If an SRNC does not support the enhanced CELL_FACH state, (i.e., Release 6 or older RNC), the SRNC does not include the "enhanced PCH indicator" IE in the PAGING REQUEST message. If the DRNC is unaware of the SRNC capabilities, the DRNC may take this as an indication that the WTRU does not support paging over HS-DSCH and page the WTRU over a PCH/S-CCPCH. However, if the cell to which the WTRU has roamed supports paging over an HS-DSCH, the WTRU will be monitoring the HS-DSCH after detection of a paging indication on a PICH.

Alternatively, if the "enhanced PCH indicator" IE is not present in the PAGING REQUEST message, the DRNC may interpret that the SRNC does not support enhanced CELL_FACH, (i.e., Release 6 or older RNC). The "enhanced PCH indicator" IE may be mandatory for a Release 7 RNSAP PAGING REQUEST message.

However, relying on the presence of this IE does not indicate to the DRNC how to page the WTRU. For example, the Release 7 WTRU might be connected to a Release 6 SRNC while monitoring an HS-DSCH in the Release 7 cell. Therefore, when the "enhanced PCH indicator" IE is not present, the DRNC may page the WTRU over both PCH/S-CCPCH and HS-DSCH to ensure that the WTRU receive the paging message, may page the WTRU over the PCH/S-CCPCH, and/or may rely on previous embodiments to know how to page the WTRU, (i.e., WTRU capabilities).

In accordance with a third embodiment, the DRNC may send a paging message over an HS-DSCH and a PCH/S-CCPCH when the DRNC is unaware of the WTRU capabilities. The DRNC may determine the WTRU capabilities according to any of the mechanisms set forth above.

In accordance with a fourth embodiment, a WTRU in the URA_PCH or CELL_PCH states may monitor both the HS-DSCH and the PCH/S-CCPCH for the PCCH frame after decoding a paging indication over the PICH if the cell supports paging over HS-DSCH, (i.e., Release 7 cell), if the WTRU supports paging over HS-DSCH, (i.e., Release 7 WTRU), and one or more of the following conditions are satisfied: (1) The WTRU has roamed from a cell that does not support enhanced CELL_FACH to a cell that supports enhanced CELL_FACH or (2) the WTRU is unaware of the capabilities of the SRNC to which it is connected, (i.e., the WTRU does not know if the SRNC supports enhanced CELL_FACH state). The WTRU may determine the SRNC capabilities according to the methods set forth below.

Alternatively, the WTRU may always monitor both HS-DSCH and PCH/S-CCPCH for reception of the PCCH frame.

Methods for determining SRNC capabilities are disclosed hereafter. When a WTRU is in an IDLE mode, (i.e., the WTRU does not have an RRC connection to the UTRAN), the WTRU may implicitly determine that the RNC to which it is attempting to connect supports enhanced CELL_FACH if the cell supports enhanced CELL_FACH, which is determined based on the HS-DSCH common channel information broadcast in SIB 5/5bis.

If the WTRU has an RRC connection with an SRNC, (i.e., the WTRU is in a CONNECTED mode), the following methods may be used, individually or in any combination, to determine if the SRNC supports enhanced CELL_FACH.

If the WTRU has configured itself for reception of HS-DSCH in CELL_FACH state at any point throughout the life of its RRC connection with the SRNC, the WTRU may determine that the SRNC supports enhanced CELL_FACH state. Alternatively, if the WTRU has been configured to operate using any 3GPP Release 7 feature, (such as multiple-input multiple-output (MIMO) and 64 quadrature amplitude modulation (QAM) HSDPA), while connected to the SRNC, then the WTRU may determine that the SRNC supports enhanced CELL_FACH state. Preferably, a Release 7 SRNC may indicate to the WTRU that an SRNS relocation will or has taken place in order to ensure that the WTRU knows the capabilities of the SRNC to which it is connected.

Alternatively, new dedicated RRC-layer signaling between the UTRAN and the WTRU may be introduced to indicate to the WTRU that its SRNC supports enhanced CELL_FACH state and/or to configure the WTRU to operate in enhance PCH. The capability or configuration information may be added to conventional RRC messages, (e.g., RRC CONNECTION SETUP, CELL UPDATE CONFIRM, URA UPDATE CONFIRM messages), or transferred in a new RRC message that is used to indicate the capabilities of the SRNC, (e.g., SRNS CAPABILITY INFORMATION or ENHANCED PCH SETUP messages). The capability information may indicate support for enhanced CELL_FACH state, support for 3GPP Release 7 or beyond, support for enhanced PCH, and/or support for paging over HS-DSCH.

Alternatively, new broadcast signaling that provides a list of RNCs in the UTRAN that support enhanced CELL_FACH and/or 3GPP Release 7 or beyond maybe provided.

Preferably, the SRNC capability information is considered as valid by the WTRU throughout the life of its RRC connection with the SRNC. A source SRNC or a target SRNC may indicate capabilities update to the WTRU if SRNS relocation takes place to the target SRNC having different capabilities than the source SRNC. Alternatively, the Release 7 source and/or target SRNC may notify the WTRU that SRNS relocation is about to or has taken place. Preferably, a mechanism of exchange of capability between RNCs over Iur may be available. For example, during SRNS relocation, a source SRNC may indicate to a target SRNC the enhanced PCH or Release 7. The lack of capability indication may be interpreted such that the peer RNC does not support this capability.

In accordance with another embodiment, a WTRU may act as indicated by an SRNS. The SRNS may explicitly indicate to the WTRU whether it should support enhanced PCH or Release 7. The SRNS may configure the WTRU to operate using enhanced PCH. The WTRU's behavior may be modified to monitor the S-CCPCH when the SRNS does not support enhanced PCH or the SRNC does not configure the WTRU to operate in enhanced PCH mode. This applies even if the DRNC supports enhanced PCH, and the cell the WTRU is monitoring is broadcasting HS-DSCH paging system information in SIB5/5bis. The WTRU's behavior may also be modified to monitor the S-CCPCH when the SRNS supports enhanced PCH but the HS-DSCH paging system information is not broadcasted in SIB5/5bis.

Alternatively, the WTRU may monitor the HS-DSCH when the SRNS indicates that it should support HS-DSCH or Release 7. The WTRU may also monitor the HS-DSCH when the SRNS explicitly configures the WTRU to monitor the HS-DSCH. HS-DSCH system information is broadcast in SIB5/5bis.

The SRNS capabilities or configuration information may be indicated to the WTRU using one or more of the following methods:

(1) Addition of a new IE, (e.g., enhanced PCH support), that indicates the SRNS capability in the RRC messages that are used to move the WTRU to CELL_PCH and/or URA_PCH;

(2) Addition of a new IE, (e.g., enhanced PCH support), that indicates the SRNC capability in other RRC messages such as URA UPDATE CONFIRM, CELL UPDATE CONFIRM, UTRAN MOBILITY INFORMATION messages; and (3) Introduction of a new message, (e.g., "SRNS RELOCATION INFO"), that is signaled to the WTRU when SRNS relocation occurs. The SRNC capabilities are indicated within this message.

The new IE, (e.g., enhanced PCH support), may take one or a combination of the following forms:

(1) An IE that may be set to TRUE or FALSE;
(2) An IE that is an enumerated value where the following value is indicated:
  i. Enhanced PCH. The SRNC supports enhanced PCH; and
  ii. Optionally, an enumerated value for enhanced FACH may also be included;
(3) An IE that is an enumerated value where the following value is indicated:
  i. Enhanced PCH. The SRNC supports enhanced PCH;
  ii. Optionally, an enumerated value for enhanced FACH may also be included; and
  iii. No HS-DSCH support. The SRNC does not support enhanced PCH (or optionally enhanced FACH).
(4) An optional IE, which is present only if enhanced PCH is supported by the SRNC; and
(5) An optional IE, which is present only if enhanced FACH is supported by the SRNC.

Preferably, the lack of this IE implies that the SRNC is a Release 6 or older SRNC and thus the WTRU implicitly knows that the SRNC does not support enhanced PCH and/or Release 7. This IE may be mandatory for all RRC messages mentioned above or it may be mandatory if the RRC message is indicating a change of U-RNTI, (e.g., IE "New U-RNTI" is present). The presence of the new U-RNTI may imply that there has been SRNS relocation.

On the UTRAN side, the DRNC preferably pages over PCH/S-CCPCH when the SRNC is not a Release 7 SRNC or if the DRNC does not support enhanced PCH. Otherwise the DRNC pages over an HS-DSCH if the cell in which it is paging supports enhanced PCH. Signaling of the SRNC capabilities to the DRNC may be performed using one of the methods described above.

Preferably, the WTRU configuration is maintained valid, (i.e., reception of paging over HS-DSCH rather than S-CCPCH), throughout the life of the connection to the SRNC. The WTRU may reevaluate support for enhanced PCH or may be reconfigured by the UTRAN to support enhanced PCH whenever SRNS relocation takes place.

The WTRU may recognize a change of SRNC or SRNS relocation by detecting a change of the U-RNTI in any RRC message. Optionally, the WTRU may recognize that a change of SRNC has taken place if the bits related to S-RNC ID within the U-RNTI have changed. If such a condition occurs and the enhanced PCH support IE is not present in the message that was used to change the U-RNTI, the WTRU may not operate in enhanced PCH when in CELL/URA_PCH states, and may instead monitor the S-CCPCH. Alternatively, if the enhanced PCH support IE is present in the message that was used to change the U-RNTI, the WTRU may start or, if started, continue enhanced PCH operation.

The UTRAN, (either a source SRNC or a target SRNC), may indicate a capabilities update to the WTRU if SRNS relocation takes place to the target SRNC having different capabilities than the source SRNC. Alternatively, the Release 7 source SRNC and target SRNC may notify the WTRU that SRNS relocation is about to or has taken place.

Preferably, a mechanism for exchanging capability information between RNCs over Iur is available. For example, during SRNS relocation, the source SRNC may indicate to the target SRNC the enhanced PCH and/or Release 7. A lack of capability indication may be interpreted to mean that the peer RNC does not support this capability.

In accordance with another embodiment, a WTRU may determine whether it should monitor the PCH/S-CCPCH or the HS-DSCH based on capabilities of the WTRU and the cell and an additional condition related to the reception method that the WTRU used during a previous communication with the network in the current RRC connection. This additional condition ensures that the network and the WTRU are in sync with respect to the transport channel used for CELL/URA_PCH states.

The WTRU may monitor only the HS-DSCH in CELL/URA_PCH states if the WTRU has sent RRC messages, since the beginning of the RRC connection, with Release 7 SRNC and DRNC that support the enhanced PCH capability. From the time when the WTRU successfully sends an RRC message to an RNC that does not support the capability, the WTRU monitors only the S-CCPCH. The WTRU ensures that the network only sends paging over the S-CCPCH by not including the capability IE in all subsequent RRC messages until the end of the RRC connection. Detailed procedures implemented in the WTRU and the network are described below.

Upon successful RRC connection, a WTRU that is capable of receiving HS-DSCH in CELL/URA_PCH states sets an internal variable, (e.g., HS_DSCH_RECEPTION_CELL_PCH), that indicates whether the WTRU may attempt to receive HS-DSCH in CELL/URA_PCH states. The variable is set to TRUE if the cell supports the capability, and FALSE if it does not support it.

Upon cell reselection, the WTRU starts receiving HS-DSCH in CELL/URA_PCH states only if the cell supports this capability, as indicated by the broadcast SIB, and if the variable HS_DSCH_RECEPTION_CELL_PCH is set to TRUE. The WTRU sets the variable HS_DSCH_RECEPTION_CELL_PCH to FALSE upon completion of a successful cell update or URA update procedure within a cell that does not support the capability. The internal variable keeps this value until release of the RRC connection or until the next successful RRC connection request. When the internal variable is set to FALSE, the WTRU does not include its capability IE in the CELL UPDATE or URA UPDATE message, and it does not receive on HS-DSCH in CELL/URA_PCH states, (i.e., it receives on S-CCPCH). Optionally, the WTRU may set the internal variable to TRUE if the WTRU determines that SRNS relocation has taken place, (for instance, based on a change of a certain part of the U-RNTI), and if the cell supports enhanced PCH.

When paging information or data is transmitted to a WTRU in Cell_PCH or URA_PCH states, the SRNC, (if Release 7), sends the WTRU capability information along with the paging request to the DRNC if the SRNC determines that the WTRU supports the enhanced PCH capability, as described above. If the DRNC is Release 7 and supports the capability, the DRNC sends the paging message over an HS-DSCH in the concerned cells that supports the capability, and over an S-CCPCH in the other concerned cells. In all other cases, the paging message is sent over an S-CCPCH over all concerned cells. The concerned cells include all cells controlled by the DRNC and part of the URA if the WTRU is in the URA_PCH state, or a single cell if the WTRU is in the CELL_PCH state.

A DRNC that does not support this capability, (e.g., a Release 6 DRNC), sends the paging message over an S-CCPCH. In addition, an SRNC that does not support the capability will not send the capability of the WTRU along with the paging request to the DRNC.

If the SRNC is the same as the CRNC, (i.e., if there is no DRNC), and the SRNC determines that the WTRU supports the enhanced PCH capability, the SRNC sends the paging message over an HS-DSCH in all concerned cells that support the enhanced PCH capability, and over an S-CCPCH in the other concerned cells. Only a Release 7 SRNC may determine that the WTRU supports the enhanced PCH capability. A Release 6 SRNC sends the paging message over an S-CCPCH in all concerned cells.

A Release 7 SRNC determines the enhanced PCH capability of the WTRU based on whether the capability IE is contained in received messages such as CELL UPDATE, URA UPDATE, or RRC CONNECTION REQUEST messages transmitted directly from the WTRU if the SRNC is the CRNC of the cell from which the WTRU transmits the message, or relayed from the CRNC of the cell from which the WTRU transmits the message. In the latter case, the capability is only relayed to the SRNC if the CRNC is a Release 7 CRNC. If the CRNC is a Release 6 CRNC, the capability is not relayed to the SRNC and the SRNC determines that the WTRU is not capable of receiving HS-DSCH in CELL_PCH or URA_PCH states.

A Release 7 SRNC does not take into consideration the presence of a capability IE in past messages when determining the capability of the WTRU upon reception of a new message transmitted from this WTRU or relayed from the CRNC. For instance, the SRNC has determined at a certain point that the WTRU has the enhanced PCH capability and subsequently receives a message from the WTRU or a message relayed from the CRNC that does not indicate the enhanced PCH capability, the SRNC determines from that point that the WTRU does not have the enhanced PCH capability.

Alternatively, the WTRU may only modify the internal variable (HS_DSCH_RECEPTION_CELL_PCH) to FALSE if the WTRU receives information from the network indicating that the SRNC does not support the enhanced PCH. Such information may be an RRC message from the network containing an IE "new U-RNTI" in a cell where the enhanced PCH feature is not available. The information may be an RRC message from the network containing the IE "new U-RNTI" and the new U-RNTI value indicates that the RNC ID has changed (SRNS relocation) in a cell where the enhanced PCH feature is not available. The information may be a UTRAN mobility information message in a cell where the enhanced PCH feature is not available. An RNC may obtain the WTRU capability information through the RRC connection establishment procedure or through the SRNS relocation procedure. It is not required that the RNC obtains the capability information through CELL UPDATE or URA UPDATE messages. Detailed procedures in the WTRU and the network are described below.

Upon successful RRC connection, a WTRU that is capable of receiving HS-DSCH in Cell/URA_PCH states may set an internal variable, (e.g., HS_DSCH_RECEPTION_CELL_PCH), that indicates whether the WTRU may attempt to receive HS-DSCH in Cell/URA_PCH states. The internal variable is set to TRUE if the cell supports the capability, and FALSE if it does not support it.

Upon cell reselection, the WTRU may start receiving HS-DSCH in Cell/URA_PCH states only if the cell supports this capability, as indicated by the broadcast SIB, and if the internal variable HS_DSCH_RECEPTION_CELL_PCH is set to TRUE. The WTRU sets the variable HS_DSCH_RECEPTION_CELL_PCH to FALSE upon reception of an RRC message satisfying one or more of the conditions above. The variable keeps this value until release of the RRC connection or until the next successful RRC connection request.

When paging or data is transmitted to a WTRU in Cell_PCH or URA_PCH states, the SRNC (if Release 7) sends the WTRU capability information along with the paging request to the DRNC if the SRNC determines that the WTRU supports the capability and will attempt reception of paging on HS-DSCH.

The SRNC obtains the WTRU capability information by an RRC connection establishment procedure if the WTRU started its RRC connection with this RNC, or by SRNS relocation through transfer of WTRU capability information within a transparent container from the source SRNC to the target SRNC. It should be noted that such transfer is only possible if the source SRNC knows about the enhanced PCH capability (Release 7 and beyond).

The SRNC knows that the WTRU will attempt reception of paging on an HS-DSCH if it knows the WTRU supports the capability and if it has never sent an RRC message to the WTRU that satisfies the same condition or set of conditions that the WTRU checks for setting its variable to FALSE. The UTRAN and WTRU must use the same condition or set of conditions. This is preferably pre-determined.

If the DRNC is Release 7 DRNC that supports the enhanced PCH capability and receives a paging request message from the SRNC indicating that the WTRU supports the enhanced PCH capability, the DRNC sends the paging message over an HS-DSCH in the concerned cells that support the enhanced PCH capability, and over an S-CCPCH in the other concerned cells. In all other cases the paging message is sent over the S-CCPCH over all concerned cells. The concerned cells include all cells controlled by the DRNC and part of the URA if the WTRU is in the URA_PCH state, or a single cell if the WTRU is in the Cell_PCH state. A DRNC that does not support the enhanced PCH capability sends the paging message over an S-CCPCH. An SRNC that does not support the enhanced PCH capability does not send the WTRU capability information along with the paging request to the DRNC.

If the SRNC is the same as the CRNC, (i.e., there is no DRNC), and the SRNC determines that the WTRU supports the enhanced PCH capability, the SRNC sends the paging message over an HS-DSCH in all concerned cells that supports the capability, and over an S-CCPCH in the other concerned cells. Only a Release 7 SRNC may determine that the WTRU has the enhanced PCH capability. A Release 6 SRNC sends the paging message over an S-CCPCH in all concerned cells.

Figure 2:
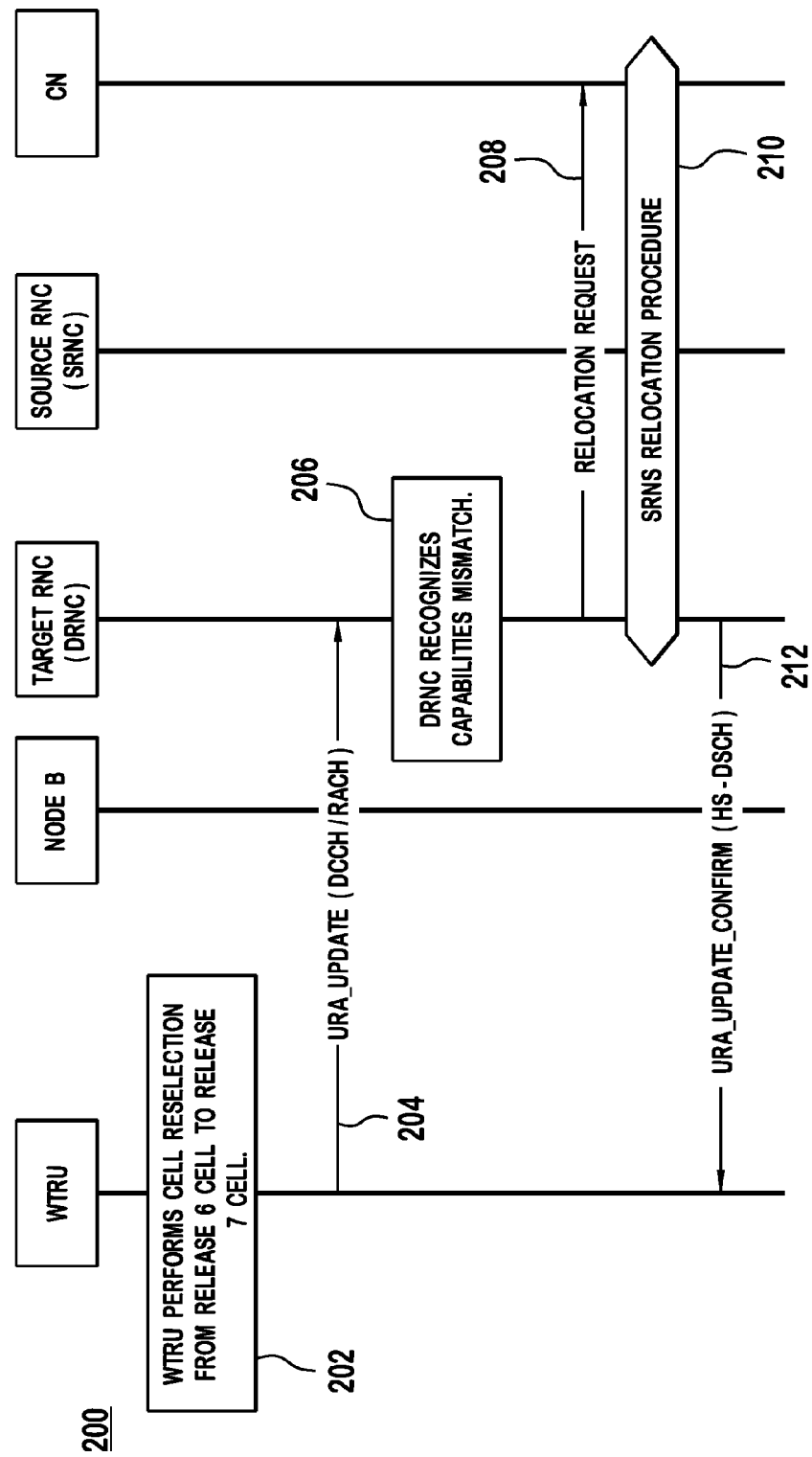
FIG. 2 shows a signaling procedure for DRNC-initiated SRNS relocation.

FIG. 2 shows a signaling procedure 200 for DRNC-initiated SRNS relocation. A Release 7 DRNC initiates an SRNS relocation procedure when it realizes that a Release 7 WTRU has roamed from a Release 7 cell while having an RRC connection to a Release 6 SRNC. A WTRU performs cell reselection from a Release 6 cell to a Release 7 cell (step 202). The WTRU then sends a URA UPDATE message to a target RNC, (i.e., DRNC) via a random access channel (RACH) (step 204). The URA UPDATE message includes an indication of the WTRU enhanced PCH capability as stated above. The target RNC recognizes the capability mismatch in WTRU and a source RNC, (i.e., SRNC) (step 206). The target RNC sends a relocation request message to the core network over the Iu interface to initiate the SRNS relocation procedure (step 208). The relocation request may be realized by either extending the use of conventional RANAP signaling, (e.g., RELOCATION REQUIRED), to allow the target RNC to request SRNS relocation or by defining a new RANAP signal, (e.g., RELOCATION REQUEST), between the target RNC and the CN.

The core network, the source RNC and the target RNC perform SRNS relocation (step 210). Once the SRNS relocation is complete, the new SRNC, which was previously the DRNC, creates and transfers a Release 7 URA UPDATE CONFIRM message to the WTRU over the HS-DSCH (step 212).

Alternatively, the DRNC transfers a relocation request message over the Iur interface (RNSAP) and the SRNC may initiate the conventional SRNS relocation procedure with the core network over the Iu interface.

Figure 3:
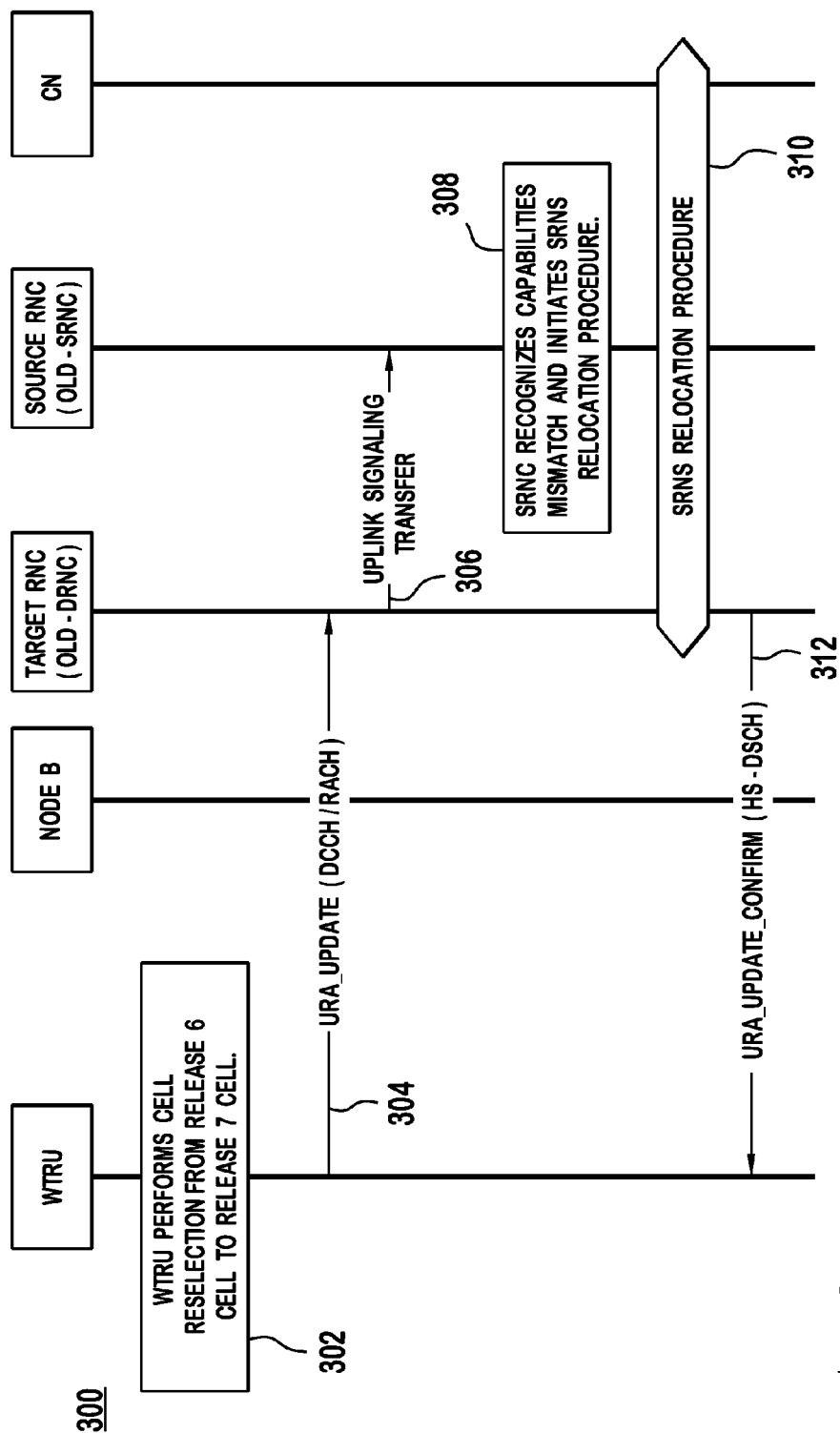
FIG. 3 shows a signaling procedure for SNRC-initiated SRNS relocation.

FIG. 3 shows a signaling procedure 300 for SRNC-initiated SRNS relocation. A WTRU performs cell reselection from a Release 6 cell to a Release 7 cell (step 302). The WTRU then sends a URA UPDATE message to a target RNC, (i.e., DRNC) via a random access channel (RACH) (step 304). The URA UPDATE message includes an indication of the WTRU enhanced PCH capability as stated above. The target RNC sends an Uplink Signaling Transfer message to a source RNC, (i.e., SRNC) (step 306). The SRNC recognized capabilities mismatch in the WTRU and the SRNC and initiates SRNS relocation procedure (step 308).

The SRNC initiates an SRNS relocation procedure if one or a combination of the following conditions is satisfied:

(1) The SRNC receives an RRC message from a WTRU indicating that the WTRU has capabilities that the SRNC does not support, (e.g., WTRU is Release 7 WTRU and the SRNC is Release 6 SRNC);

(2) The SRNC receives an Uplink Signaling Transfer message over Iur containing a dedicated H-RNTI when the SRNC does not support enhanced PCH;

(3) The WTRU has roamed to a cell that is controlled by an RNC, (i.e., DRNC), that has capabilities that are not supported by the SRNC; or (4) The SRNC that does not support enhanced PCH receives a URA UPDATE message from a WTRU indicating that it supports enhanced PCH, when the WTRU roams to a cell that is controlled by a different RNC.

The core network, the source RNC and the target RNC perform SRNS relocation (step 310). Once the SRNS relocation is complete, the new SRNC, which was previously the DRNC, creates and transfers a Release 7 URA UPDATE CONFIRM message to the WTRU over the HS-DSCH (step 312). Preferably, the target RNC of the relocation procedure would be the existing DRNC, (i.e., the CRNC that controls the cell to which the WTRU is connected).

Two or more RNCs in a UTRAN may exchange information related to capability of the WTRUs. A new RNSAP message may be used to allow one RNC with knowledge of WTRU capability to share the information with another RNC. The RNC may send the WTRU capability information to any given RNC. The RNC may broadcast the WTRU capability information to many RNCs. Alternatively, one RNC may request another RNC to send WTRU capability information if it has knowledge regarding capabilities a given WTRU.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for triggering a transfer of an update message by a wireless transmit/receive unit (WTRU) in a URA_PCH state, the method comprising:
the WTRU in the URA_PCH state performing cell reselection from a first cell that does not support enhanced paging channel (PCH) to a second cell in a same UTRAN routing area (URA) that does support enhanced PCH;

triggering the transfer of the update message upon a determination that the WTRU has reselected to the second cell in the same URA that supports enhanced PCH;

indicating in the update message that the WTRU is capable of monitoring a high speed downlink shared channel (HS-DSCH) for paging messages; and monitoring the HS-DSCH for paging messages on the second cell.

2. The method of claim 1 wherein the determination that the WTRU has reselected to the second cell in the same URA that does support enhanced PCH is based on whether an information element (IE) HS-DSCH paging system information is present in a system information block.

3. The method of claim 1 wherein the second cell is controlled by a radio network controller (RNC) that is different from an RNC that controlled the first cell.

4. The method of claim 3 wherein the WTRU determines that the RNC of the second cell is different if a serving RNC identity in a UTRAN radio network temporary identity (U-RNTI) is different than 12 most significant bits of a cell identity.

5. The method of claim 1 wherein the transfer of the update message is triggered if the WTRU is unaware if a radio network controller (RNC) to which the WTRU is connected supports enhanced PCH.

6. The method of claim 1 wherein the update message is a URA UPDATE message.

7. A wireless transmit/receive unit (WTRU) configured to receive a paging message in a URA_PCH state, the WTRU comprising:

a controller configured to trigger transfer of an update message when the WTRU in the URA_PCH state reselects from a first cell that does not support enhanced paging channel (PCH) to a second cell in the same UTRAN routing area (URA) that does support enhanced PCH, the update message including an indication that indicates an enhanced PCH capability of receiving a high speed downlink shared channel (HS-DSCH) in the URA_PCH state; and a transceiver configured to:
monitor a HS-DSCH for paging messages on the second cell; and
receive a message over an HS-DSCH.

8. The WTRU of claim 7 wherein a determination that the WTRU has reselected to the second cell in the same URA that does support enhanced PCH is made based on whether an information element (IE) HS-DSCH paging system information is present in a system information block.

9. The WTRU of claim 7 wherein the update message including the indication is sent on a condition that the second cell supporting enhanced PCH is controlled by a radio network controller (RNC) that is different than an RNC that controls the first cell.

10. The WTRU of claim 9 wherein the controller determines that the RNC of the second cell is different on a condition that a serving RNC identity in a UTRAN radio network temporary identity (U-RNTI) is different than 12 most significant bits of a cell identity.

11. The WTRU of claim 7 wherein the transfer of the update message is triggered if the WTRU is unaware if a radio network controller to which the WTRU is connected supports enhanced PCH.

12. The WTRU of claim 7 wherein the update message is a URA UPDATE message.

* * * * *